(12) United States Patent
Meredith et al.

(10) Patent No.: US 11,283,644 B2
(45) Date of Patent: Mar. 22, 2022

(54) FACILITATION OF ACCESS POINT AUTHENTICATED TUNNELING FOR 5G OR OTHER NEXT GENERATION NETWORK

(71) Applicants: AT&T Intellectual Property I, L.P., Atlanta, GA (US); AT&T Mobility II LLC, Atlanta, GA (US)

(72) Inventors: Sheldon Meredith, Roswell, GA (US); Brandon Hilliard, Canton, GA (US); Zachary Meredith, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 65 days.

(21) Appl. No.: 16/808,963

(22) Filed: Mar. 4, 2020

(65) Prior Publication Data

US 2021/0281438 A1 Sep. 9, 2021

(51) Int. Cl.
*H04L 12/28* (2006.01)
*H04L 12/54* (2013.01)
*H04L 12/46* (2006.01)
*H04W 88/08* (2009.01)
*H04W 48/16* (2009.01)
*H04W 76/12* (2018.01)

(52) U.S. Cl.
CPC ...... *H04L 12/2856* (2013.01); *H04L 12/4633* (2013.01); *H04L 12/5692* (2013.01); *H04W 48/16* (2013.01); *H04W 76/12* (2018.02); *H04W 88/08* (2013.01)

(58) Field of Classification Search
CPC ............. H04L 12/2856; H04L 12/4633; H04L 12/5692; H04W 76/12; H04W 48/16; H04W 88/08

USPC .......................................................... 370/338
See application file for complete search history.

(56) References Cited

U.S. PATENT DOCUMENTS

| | | | |
|---|---|---|---|
| 6,023,452 | A | 2/2000 | Shiragaki |
| 7,480,504 | B2 | 1/2009 | Goulet et al. |
| 7,675,882 | B2 | 3/2010 | Mighani et al. |
| 7,822,438 | B2 | 10/2010 | Parron et al. |

(Continued)

OTHER PUBLICATIONS

Higginson, et al. "Development of Router Clusters to Provide Fast Failover in IP Networks." Digital Technical Journal, vol. 9 No. 3 1997. 10 pages.

(Continued)

*Primary Examiner* — Candal Elpenord
(74) *Attorney, Agent, or Firm* — Amin, Turocy & Watson, LLP

(57) ABSTRACT

When an access point device is aware of an internet access failure, the access point device can attempt to re-route the baseband content through a different access point for the purpose of using its hard-wired internet connection. An administrative function can allow the access point device to tunnel through the internet service provider (ISP) of another access point device if permission is granted to do so. The permission can be granted beforehand or it can be granted to on the fly. Consequently, if the packets cannot route via the normal, hard-wired path, a message to a secondary transceiver of the access point device can instruct the access point device to find an alternate path via the ISP of the other access point device.

20 Claims, 10 Drawing Sheets

(56) References Cited

U.S. PATENT DOCUMENTS

| | | | |
|---|---|---|---|
| 7,839,771 B2* | 11/2010 | Zeng | H04W 24/04 370/225 |
| 7,969,953 B1* | 6/2011 | Breau | H04W 36/0069 370/338 |
| 8,027,324 B2 | 9/2011 | Kalika et al. | |
| 8,154,993 B2 | 4/2012 | Lichtwald | |
| 8,254,943 B1* | 8/2012 | Dinan | H04W 24/04 455/450 |
| 8,264,949 B2 | 9/2012 | Ravindran et al. | |
| 8,468,254 B2 | 6/2013 | Meenan et al. | |
| 8,498,201 B2 | 7/2013 | Budampati et al. | |
| 8,565,073 B2 | 10/2013 | Rahman et al. | |
| 8,730,940 B2 | 5/2014 | Mirza | |
| 8,913,487 B2 | 12/2014 | Ankaiah et al. | |
| 8,929,894 B2* | 1/2015 | Catovic | H04W 36/305 455/436 |
| 9,037,149 B2 | 5/2015 | Rahman et al. | |
| 9,788,255 B2 | 10/2017 | Villasenor | |
| 10,278,119 B2 | 4/2019 | Elliott et al. | |
| 10,355,938 B2 | 7/2019 | Saha et al. | |
| 10,375,565 B2 | 8/2019 | Vasseur et al. | |
| 2007/0297421 A1 | 12/2007 | Huseth | |
| 2008/0080365 A1 | 4/2008 | Weeresinghe | |
| 2009/0172391 A1* | 7/2009 | Kasapidis | H04W 12/069 713/156 |
| 2010/0173610 A1* | 7/2010 | Kitazoe | H04W 36/0038 455/411 |
| 2014/0079022 A1* | 3/2014 | Wang | H04W 36/22 370/331 |
| 2014/0301328 A1 | 10/2014 | Yacovitch | |
| 2014/0370894 A1* | 12/2014 | Hosdurg | H04W 36/08 455/436 |
| 2015/0140999 A1* | 5/2015 | Zhang | H04L 1/00 455/424 |
| 2017/0034765 A1* | 2/2017 | Aydin | H04W 40/34 |
| 2018/0278469 A1 | 9/2018 | Gandhi et al. | |
| 2019/0239276 A1 | 8/2019 | Virtanen et al. | |

OTHER PUBLICATIONS

Raj, et al. "A survey of IP and multiprotocol label switching fast reroute schemes." Computer Networks 51 (2007) 1882-1907. 26 pages.

Wang, et al. "A Backup Route Aware Routing Protocol—Fast Recovery from Transient Routing Failures." IEEE INFOCOM 2008—The 27th Conference on Computer Communications. IEEE, 2008. 12 pages.

* cited by examiner

FACILITATION OF ACCESS POINT AUTHENTICATED TUNNELING FOR 5G OR OTHER NEXT GENERATION NETWORK

TECHNICAL FIELD

This disclosure relates generally to facilitating access point authenticated tunneling. For example, this disclosure relates to facilitating access point authenticated tunneling for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to access point authenticated tunneling is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
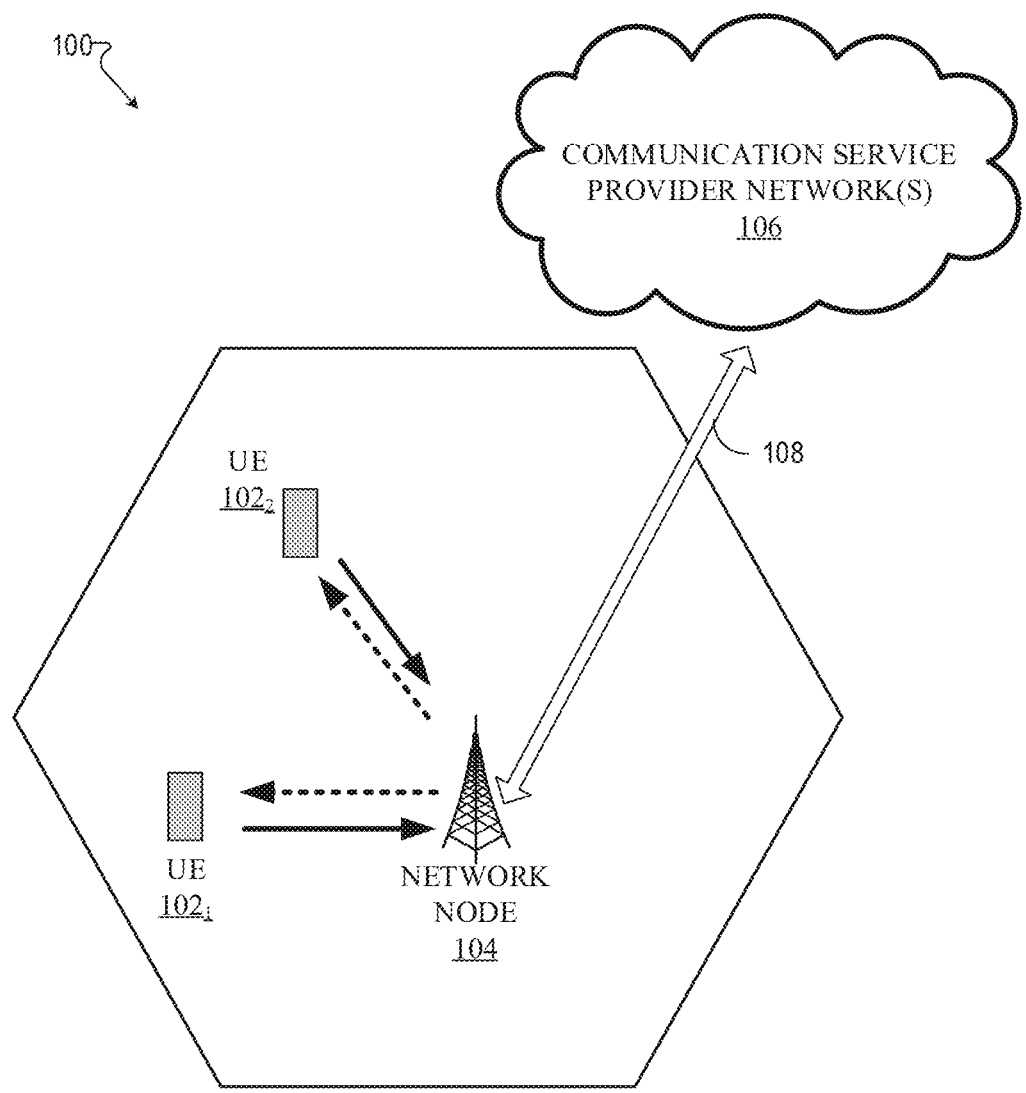
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate access point authenticated tunneling for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate a access point authenticated tunneling for a 5G network. Facilitating access point authenticated tunneling for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

When a hard-wired (ethernet) connection in a residence or a business is temporarily unavailable, access point owners are currently left without internet connectivity from that access point. This disrupts packet data transfers for entertainment, business systems, medical systems, and security systems. However, a wireless connection over an encrypted tunnel can be established between trusted access points to temporarily establish internet connectivity when a normally available (e.g., hard-wired) connection is unavailable. Thus, the disclosed functions can also protect purchased bandwidth of any hard-wired access point connection, thereby only loaning out excess bandwidth. It should be noted that the same or similar principles can be applied to non-hardwired access points.

An access point architecture can comprise a secondary transceiver, which can communicate between access points belonging to a private subnet. Normally, when a wireless device (e.g., phone, computer, IoT device, etc.) wirelessly connects to an access point transceiver, the Wi-Fi radio transmissions can be received and decoded down to baseband information, which can then be sent to the internet via a dedicated, hard-wired ethernet connection. However, when the ethernet connection is unavailable, the access point is aware of internet access failure can and attempt to re-route the baseband content through a different Wi-Fi access point for the purpose of using its hard-wired internet connection. To do this, a baseband data packet buffer can collect packets received from the wireless mobile device via the access point antenna. If these packets cannot route via the normal, hard-wired path, a message to the secondary transceiver inside the Wi-Fi access point can instruct it to find an alternate path. For example, if a business owner with internet service loses internet connectivity, their access point can directly talk to the next door business owner's access point, having working connectivity from another service provider, and create a tunnel to allow the first business owner transactions to flow through the second business owner's service connection for a limited period of time.

The alternate path using the secondary transceiver can scan for broadcasts of other access points belonging to a list of associated access points. Association can be an administrative action that permits Wi-Fi access points to use each other for re-routing purposes. Scanning for access point broadcasts can be performed all the time or intermittently and does not have to wait for a connection failure. This means that many associated access points can be constantly connected, even when they don't need to be. Pre-connections can facilitate immediate re-routing of data without the latency incurred from scanning and establishing a connection. The connections between the secondary transceivers of associated access points can use Wi-Fi frequencies, and can also use any wireless communication modulation/protocol and frequency band. Thus, an access point can receive information from two different paths, to either the primary or secondary transceiver. Any one of the associated access points can create encrypted tunnels through other associated access points, ultimately achieving an ethernet connection to the internet or other devices which can be connected locally by a Wi-Fi access point. This can occur in a neighborhood data hub where a failed device affects adjacent neighboring locations.

In cases where associated access points are used for indirect routing, over-the-air communication channels can be encrypted using typical encryption methods such as wired equivalency privacy (WEP). To ensure security of the baseband data, a first access point in the chain can establish a virtual private network (VPN) tunnel back to its home internet service provider (ISP). Doing so can prevent "man-in-the-middle" snooping at any associated access point along the way. The VPN connection, like the connections between associated access points can also always on to avoid delays when packet re-routing is utilized.

A wireless hop to a different Wi-Fi access point or other synonymous radio connection can be a back-up to a primary connection (e.g., wired ethernet connection, and/or wireless connection). For example, if a wireless hot spot associated with one carrier fails, then the back-up can be to utilize a wireless hot spot whose primary interface is ethernet or wireless to another carrier. Administrative privileges can allow those connections to authenticate through a dedicated tunnel to separate the usage (e.g., usage from the owner of the access point) on that access point from other users. In another example, if wired connectivity associated with a specific service provider fails for four access point devices, and there is another access point associated with another service provider, then the four access point devices can have privileges to utilize the other access point device and resources associated therewith via dedicated tunnels. However, security-wise, they can remain separate from the other service provider access point device and receive only additional available bandwidth left over if the owner of the other access point device is not utilizing the bandwidth.

In one embodiment, described herein is a method comprising requesting, by a first wireless network device comprising a processor, a utilization of a second wireless network device to establish an internet connection. In response to the requesting, the method can comprise receiving, by the first wireless network device, access data representative of an access to the second wireless network device. Additionally, the method can comprise receiving, by the first wireless network device, an indication of a failed internet connection. In response to the receiving the indication of the failed internet connection, the method can comprise facilitating, by the first wireless network device, establishing the internet connection via the second wireless network device, resulting in an established internet connection.

According to another embodiment, a system can comprise receiving, by a first access point device from a second access point device, request data representative of a request to utilize the first access point device as a host for an internet connectivity. In response to the receiving, the system can comprise sending, by the first access point device, permission data representative of a permission to utilize the first access point device as the host for the internet connectivity. Furthermore, in response to an interrupted internet connectivity experienced by the second access point device, the system can comprise facilitating, by the first access point device, the internet connectivity for the second access point device.

According to yet another embodiment, described herein is a machine-readable medium that can perform the operations comprising receiving request data representative of a request to utilize a first access point device as a host access point device for an internet connectivity. In response to the receiving, the machine-readable medium can perform the operations comprising facilitating sending of permission data representative of a permission to utilize the first access point device as the host access point device for the internet connectivity. Furthermore, in response to receiving an indication of a service failure experienced by a second access point device, the machine-readable medium can perform the operations comprising facilitating the internet connectivity for the second access point device via the first access point device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
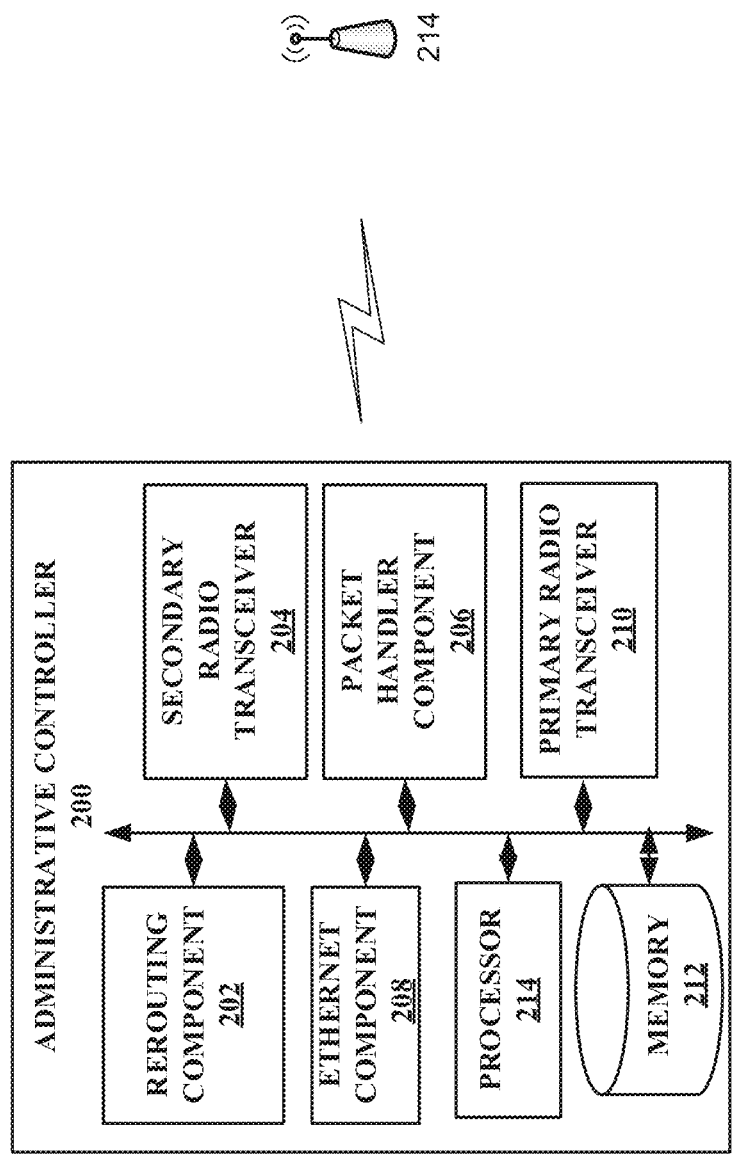
FIG. 2 illustrates an example schematic system block diagram of an administrative controller according to one or more embodiments.
Figure 3:
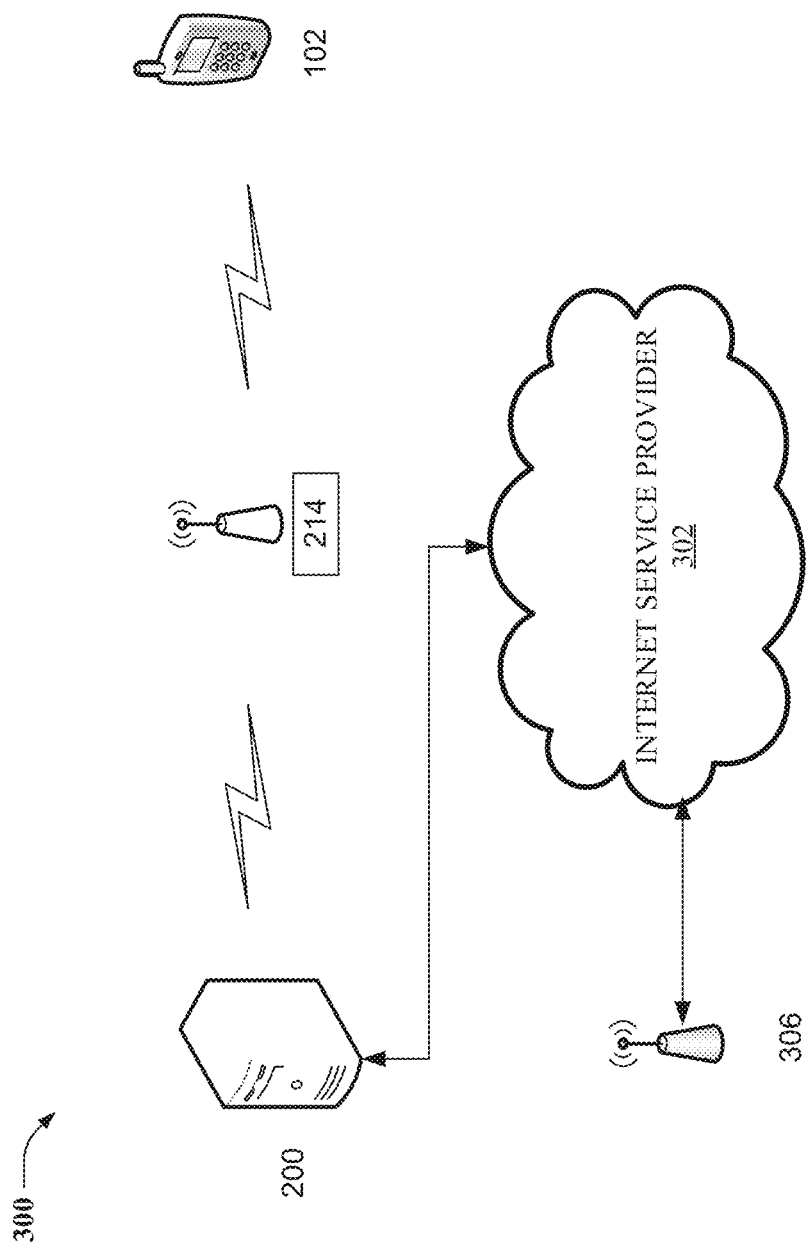
FIG. 3 illustrates an example schematic system block diagram of an access point tunneling system according to one or more embodiments.

Referring now to FIG. 2 and FIG. 3, illustrated is an example schematic system block diagram of an administrative controller 200 and a tunneling system 300 according to one or more embodiments. In the embodiment depicted in FIG. 2, the administrative controller 200 can comprise sub-components (e.g., rerouting component 202, secondary radio transceiver 204, ethernet component 208, packet handler component 206, and primary radio transceiver 210), processor 216 and memory 212 can bi-directionally communicate with each other. It should also be noted that in alternative embodiments that other components including, but not limited to the sub-components, processor 216, and/or memory 212, can be external to the administrative controller 200. Aspects of the processor 216 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the administrative controller 200. In an aspect, the administrative controller 200 can also include memory 212 that stores computer executable components and instructions.

The administrative component 200 can communicate with the wireless access point 214. It should be noted that in some cases, the administrative component 200 can be hosted at the access point device 214. Administration of the association of Wi-Fi access points can occur via several methods including a web-based administration page, a peer-to-peer pairing approach, and/or manual sharing of credentials. Based on administrative privileges, access points can create extended-tunnels through multiple associated access points, which can be valuable if more than one access point has a loss of ethernet connectivity.

The administrative component 200 can facilitate an agreement between neighboring access point devices that allows one access point device (e.g., access point device 214) to utilize the other access point device (e.g., access point device 306) in the case of one of the access point device (e.g., access point device 214) failing. The administrative component 200 can leverage the agreement to execute connectivity based on the agreement. For example, because the agreement has been performed in advance, if the first access point fails (e.g., access point device 214), it can know that there is a second access point (e.g., access point device 306) that it can leverage for communication with the UE 102 by establishing a tunnel through to the second access point (e.g., access point device 306) via the second access point device's ISP 302 (e.g., wired and/or wireless). For example, when the primary radio transceiver 210 of the access point device 214 fails to make a direct connection to the web due to a failed link, the administrative controller 200 can utilize the packet handler component 206 to identify packets that should be rerouted. The packet handler component 206 can collect packets received from the UE 102 via the primary radio transceiver 210. The ethernet component 208 can determine whether the ethernet of the access point device 214 and/or any associated access point device (e.g., access point device 306) ethernet is operable. If the ethernet of the access point device 214 has been determined to have failed and the packets cannot route via the normal, hard-wired path, a message can be sent to the secondary radio transceiver 204 of the access point device 214 to instruct it to find an alternate path. If the ethernet and/or wireless communication of another access point device (e.g., access point device 306) is determined to be operable, then the administrative controller 200 can reroute the packet data through an extended tunnel associated with the other access point device (e.g., access point device 306) via the secondary radio transceiver 204 associated with the other access point device (e.g., access point device 306).

Figure 4:
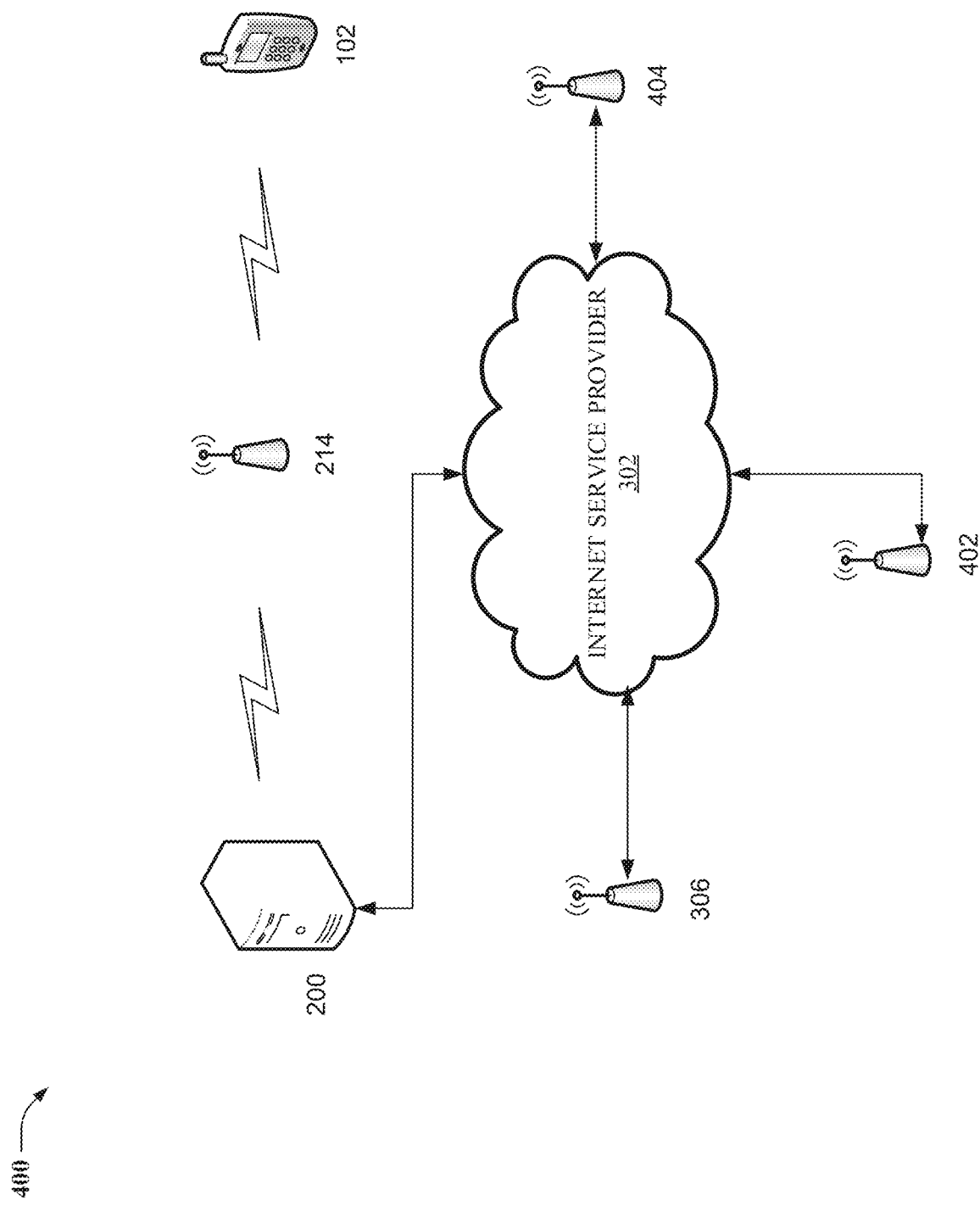
FIG. 4 illustrates an example schematic system block diagram of multiple access point tunneling according to one or more embodiments.

Referring now to FIG. 4, illustrated is an example schematic system block diagram of multiple access point tunneling according to one or more embodiments.

In another embodiment, the administrative component 200 can facilitate an agreement between multiple neighboring access point devices that allows one access point device (e.g., access point device 214) to utilize the various other access point devices (e.g., access point devices 306, 402, 404) in the case of multiple access point devices (e.g., access point devices 214, 306, 402) failing. The administrative component 200 can leverage the agreements between the access point devices 214, 306, 402, 404 to execute connectivity based on the agreement. For example, the agreement can be performed in advance or on the fly in response to the access point device 214 failure. When the first access point fails (e.g., access point device 214), it can know that there is a second access point (e.g., access point device 306) that it can leverage for communication with the UE 102 by establishing a tunnel through to the second access point (e.g., access point device 306) via the second access point device's ISP 302 (e.g., wired and/or wireless). However, if the second access point 306 is unavailable (e.g., has failed), the first access point device 214 can tunnel to the third access point device 402, through the second access point device 306 to gain access to the internet. If the second access point device 306 has failed, then the first access point device 214 can tunnel through the second access point device 306 and the third access point device 402 to get to the fourth access point device 404 and achieve internet access via UE 102 as orchestrated by the administrative controller 200.

The communication between access point devices 214, 306, 402, 404 can be facilitated through a wireless link (e.g., Wi-Fi). For example, the first access point device 214 can comprise two receivers. The first receiver can be a receiver (e.g., primary radio transceiver 210) that a computer (e.g., UE 102) can utilize to connect to the second access point device 306. The second receiver (e.g., secondary radio transceiver 204) could be one that is listening for transmissions from another access point (e.g., second access point device 306), which can be on a different frequency band, a different connection protocol, etc. Thus, the first access point device 214 can behave as an access point for connecting to wireless devices (e.g., UEs, laptops, IoT devices, etc.). However, the first access point device 214 can also behave as a wireless device when it is attempting to connect to another access point device (e.g., second access point device 306). In another embodiment, if the administrative function can not be established, and the administrative process can be initiated on the fly in response to an access point failure. Additionally, a communication association component can identify that specific communication is not associated with the primary access point lessor/owner. For instance, data being sent from the first access point device 214 though the second or third access point devices 306, 402, should not be attributed to the second or third access point devices 306, 402.

Figure 5:
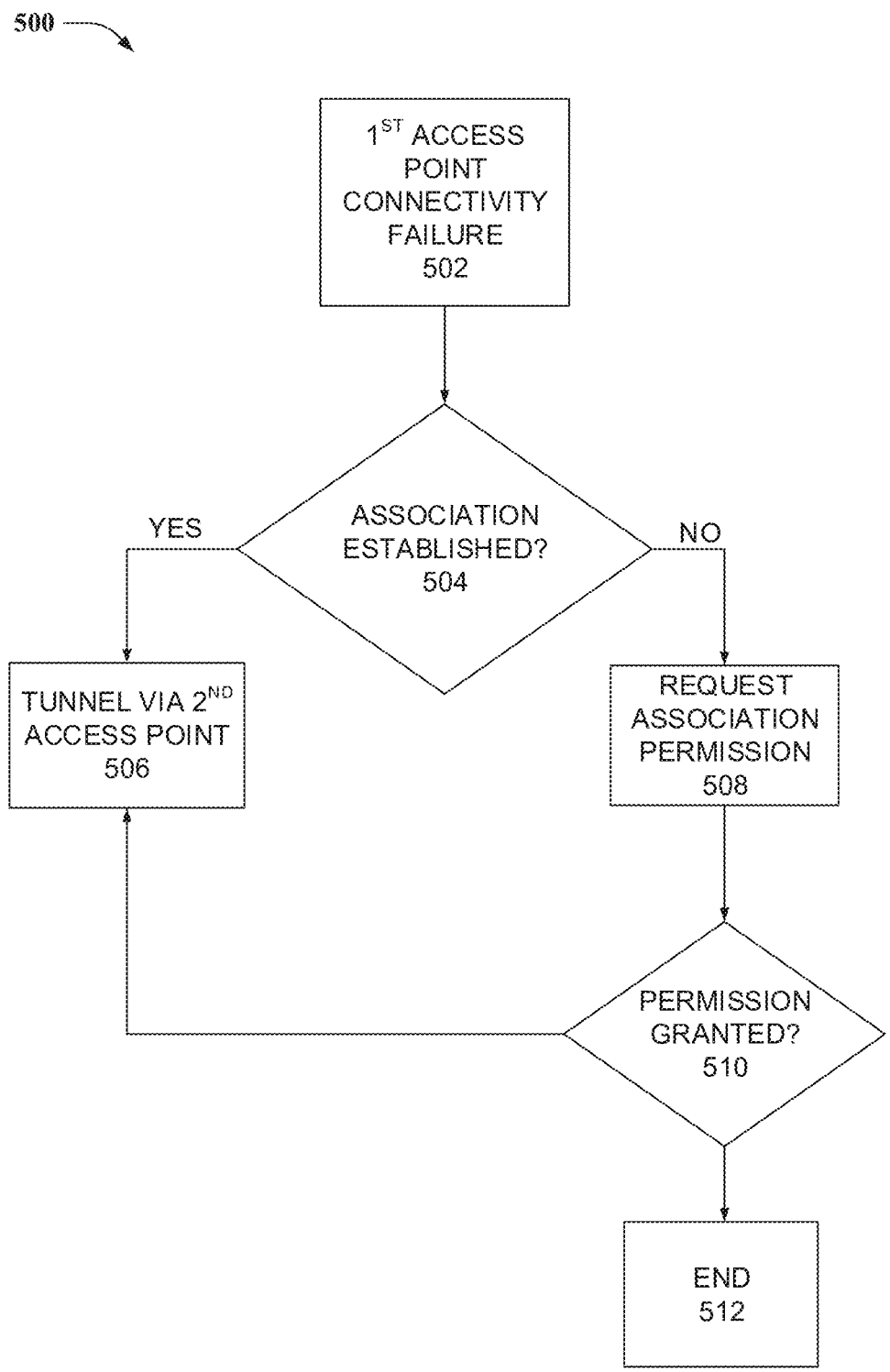
FIG. 5 illustrates an example schematic flow diagram of an access point device tunneling procedure according to one or more embodiments.

Referring now to FIG. 5 illustrates an example schematic flow diagram of an access point device tunneling procedure 500 according to one or more embodiments. At block 502, when there is an access point device 214 connectivity failure, the administrative controller 200 can determine if there has been an association established between the access point device 214 and another access point device 306, 402, 404. If there has been an association established (previously) at block 504, then the access point device 214 can tunnel through the other access point device 306, 402, 404 to access internet connectivity. Alternatively, if there has not been a previous association established between access point devices, then the access point device 214 can request permission (e.g., on the fly) at block 508 to tunnel through another access point device 306, 402, 404 for access internet connectivity. If authorization or permission is granted at block 510 by the access point device 306, then the access point device 214 can tunnel through the access point device 306 to access internet connectivity. However, if the access point device 306 does not provide permission, then the access point device 214 can iteratively check with the other access point devices 402, 404 until permission is granted. Alternatively, if no permission is granted by any neighboring access point device 302, 402, 404, then the procedure can end at block 512.

Figure 6:
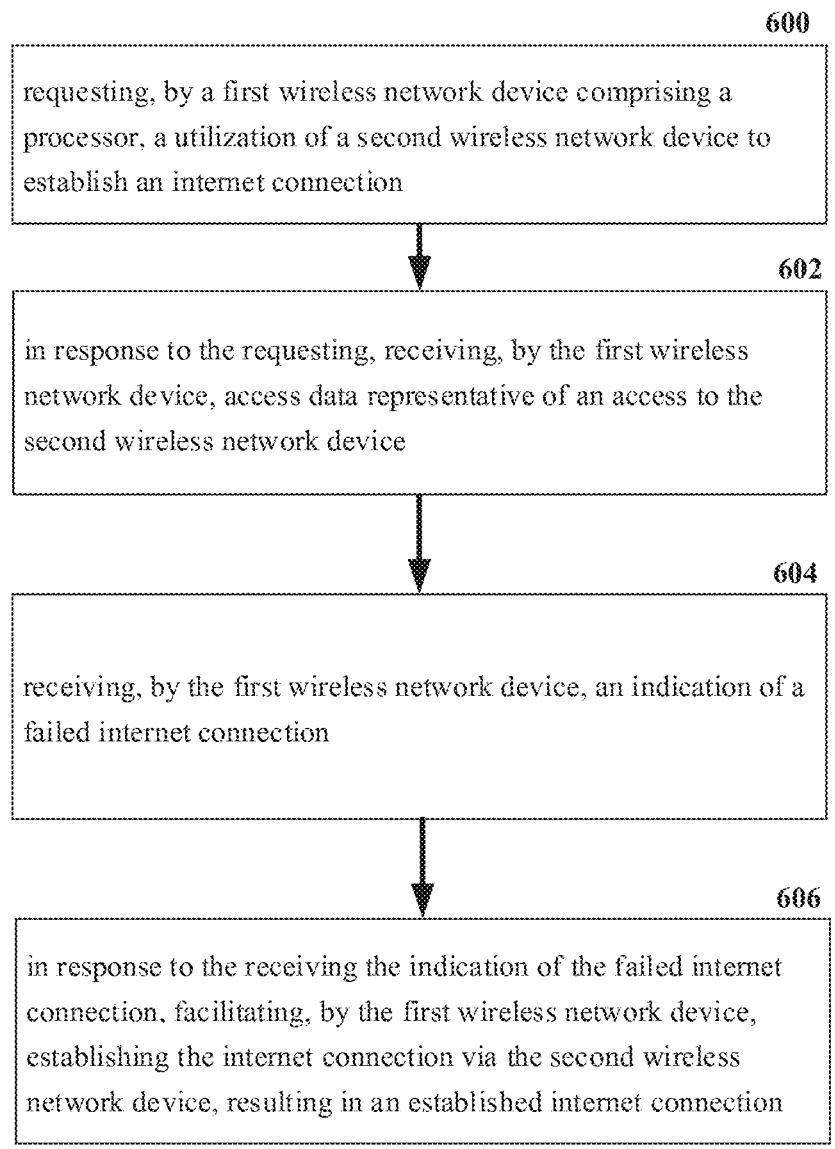
FIG. 6 illustrates an example flow diagram of a method for facilitating access point authenticated tunneling for a 5G network according to one or more embodiments.

Referring now to FIG. 6, illustrated is an example flow diagram of a method for facilitating access point authenticated tunneling for a 5G network according to one or more embodiments. At element 600, the method can comprise requesting, by a first wireless network device comprising a processor, a utilization of a second wireless network device to establish an internet connection. In response to the requesting, at element 602, the method can comprise receiving, by the first wireless network device, access data representative of an access to the second wireless network device.

Additionally, at element 604, the method can comprise receiving, by the first wireless network device, an indication of a failed internet connection. In response to the receiving the indication of the failed internet connection, at element 606, the method can comprise facilitating, by the first wireless network device, establishing the internet connection via the second wireless network device, resulting in an established internet connection.

Figure 7:
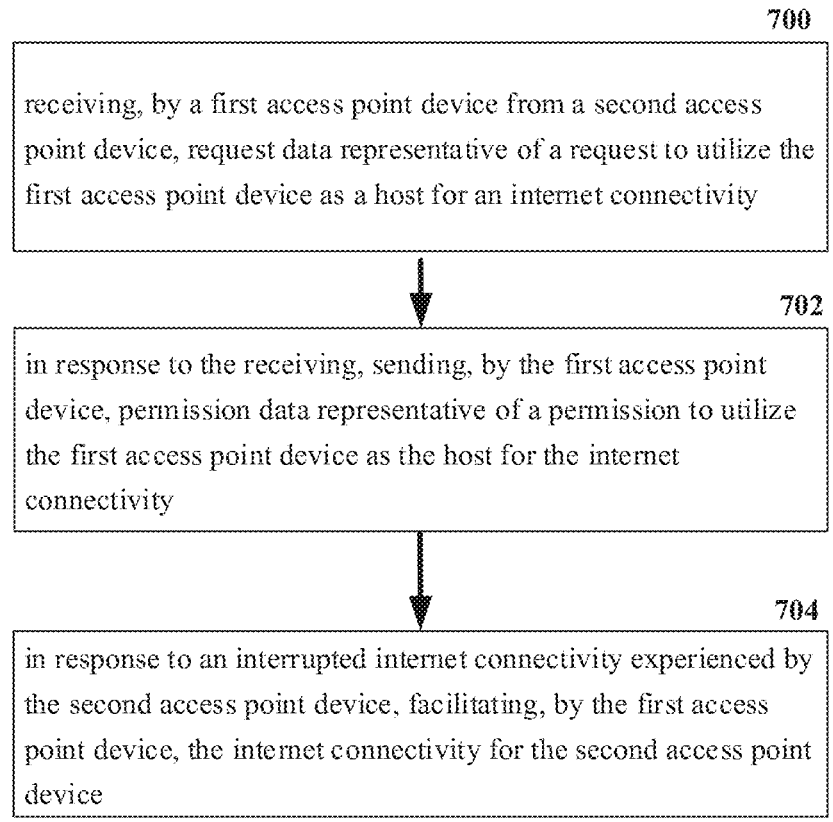
FIG. 7 illustrates an example flow diagram of a system for facilitating access point authenticated tunneling for a 5G network according to one or more embodiments.

Referring now to FIG. 7, illustrated is an example flow diagram of a system for facilitating access point authenticated tunneling for a 5G network according to one or more embodiments. At element 700, the system can comprise receiving, by a first access point device from a second access point device, request data representative of a request to utilize the first access point device as a host for an internet connectivity. In response to the receiving, at element 702, the system can comprise sending, by the first access point device, permission data representative of a permission to utilize the first access point device as the host for the internet connectivity. Furthermore, in response to an interrupted internet connectivity experienced by the second access point device, at element 704, the system can comprise facilitating, by the first access point device, the internet connectivity for the second access point device.

Figure 8:
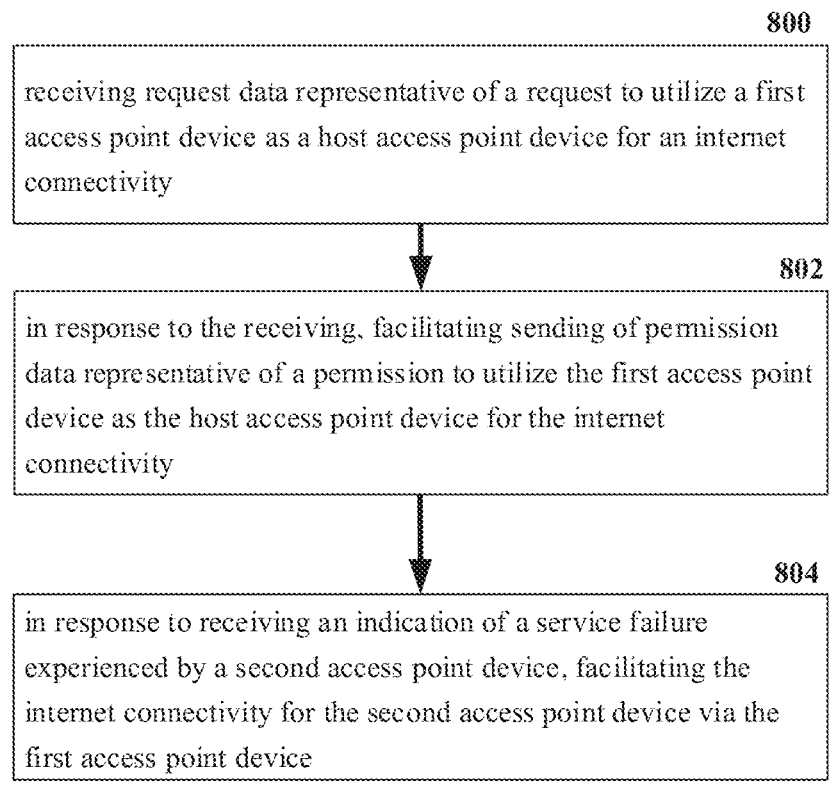
FIG. 8 illustrates an example flow diagram of a machine-readable medium for facilitating access point authenticated tunneling for a 5G network according to one or more embodiments.

Referring now to FIG. 8, illustrated is an example flow diagram of a machine-readable medium for facilitating access point authenticated tunneling for a 5G network according to one or more embodiments. At element 800, the machine-readable medium can perform the operations comprising receiving request data representative of a request to utilize a first access point device as a host access point device for an internet connectivity. In response to the receiving, at element 802, the machine-readable medium can perform the operations comprising facilitating sending of permission data representative of a permission to utilize the first access point device as the host access point device for the internet connectivity. Furthermore, in response to receiving an indication of a service failure experienced by a second access point device, at element 804, the machine-readable medium can perform the operations comprising facilitating the internet connectivity for the second access point device via the first access point device.

Figure 9:
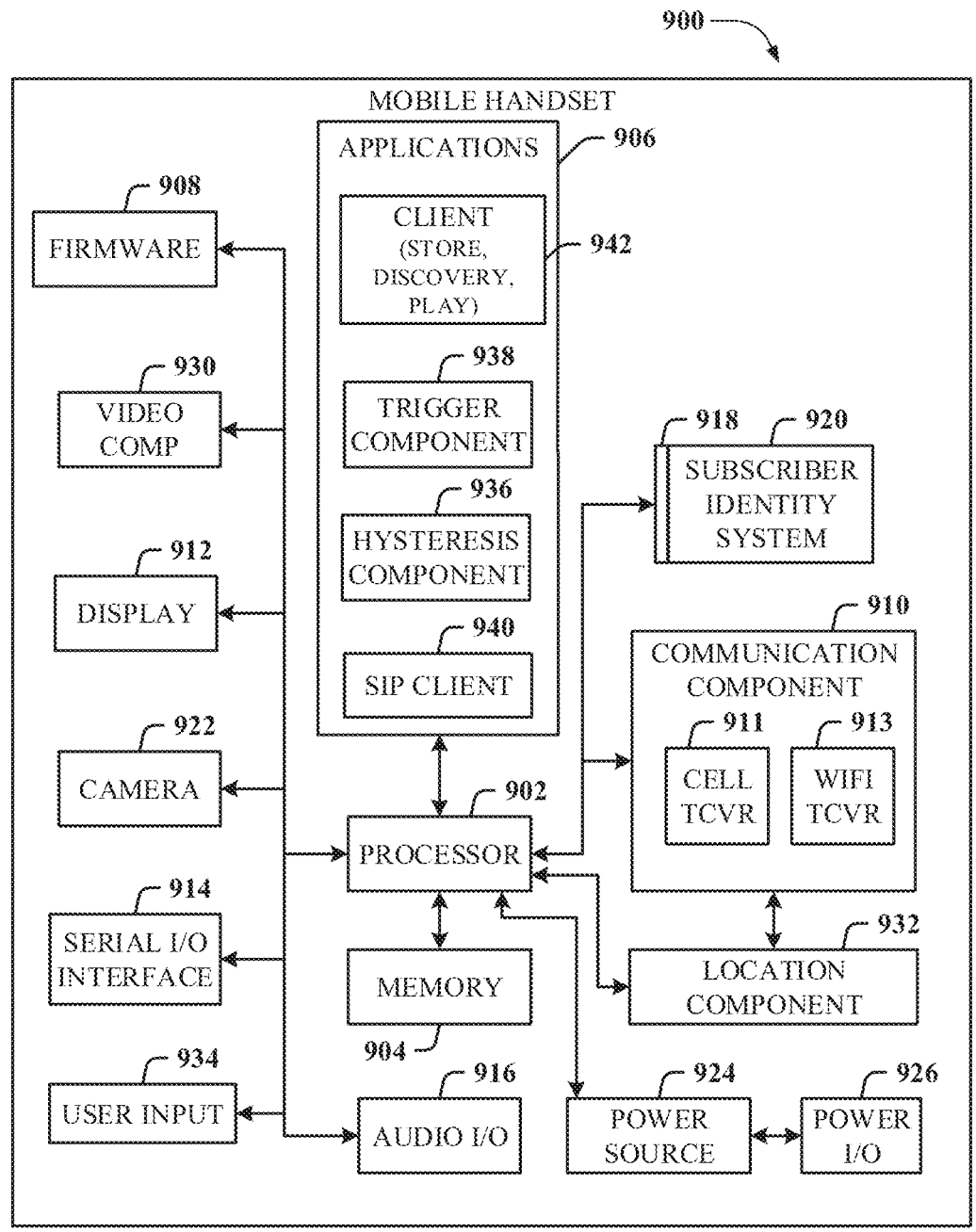
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
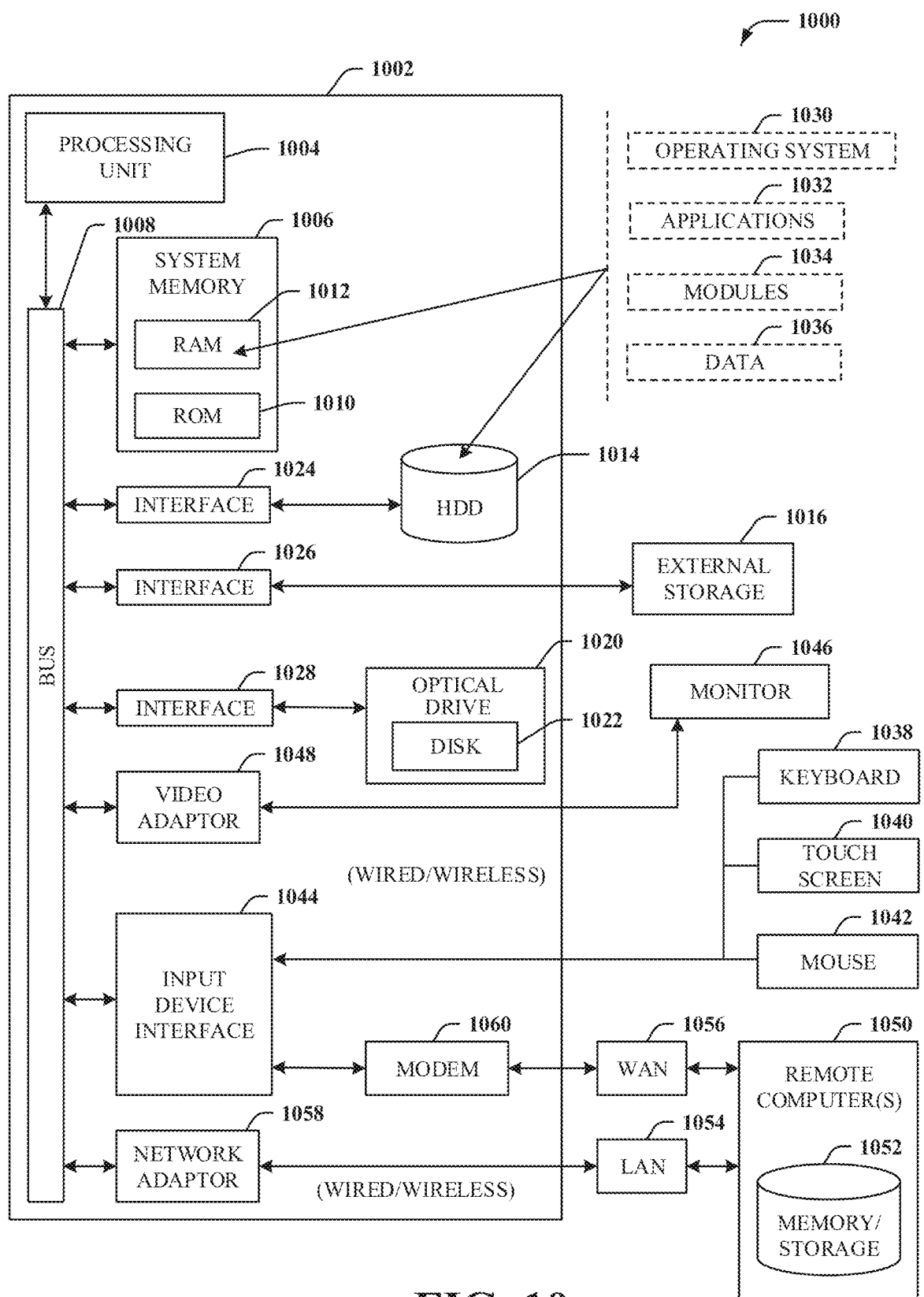
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   requesting, by a first network access point device comprising a processor, a utilization of a second network access point device to establish an internet connection;
   in response to requesting the utilization, receiving, by the first network access point device, access data representative of an access to the second network access point device;
   receiving, by the first network access point device, an indication of a failed internet connection; and
   in response to the receiving the indication of the failed internet connection after receiving the access data, facilitating, by the first network access point device, establishing the internet connection via the second network access point device, resulting in an established internet connection, wherein the establishing comprises using an encrypted tunnel through the second network access point device, and wherein, as a result of a configuration of the encrypted tunnel, the second network access point device is unable to decode encrypted internet data that is trafficked via the encrypted tunnel and that is associated with the established internet connection used by the first network access point device.

2. The method of claim 1, wherein the first network access point device has been previously determined to have established the internet connection via a hard-wired connection, and wherein the establishing of the internet connection is performed via a wireless connection.

3. The method of claim 2, wherein the hard-wired connection is an ethernet connection.

4. The method of claim 2, wherein the wireless connection is a Wi-Fi connection.

5. The method of claim 1, further comprising:
in response to receiving the access data, labeling, by the first network access point device, the second network access point device as a trusted network access point device.

6. The method of claim 1, wherein the established internet connection is restricted as a function of excess bandwidth determined not to be utilized by the second network access point device.

7. A first access point device, comprising:
a processor; and
a memory that stores executable instructions that, when executed by the processor, facilitate performance of operations, comprising:
receiving from a second access point device, request data representative of a request to utilize the first access point device as a host for an internet connectivity;
in response to the receiving, sending permission data representative of a permission to utilize the first access point device as the host for the internet connectivity; and
in response to an interrupted internet connectivity experienced by the second access point device, enabling the internet connectivity for the second access point device, wherein the enabling comprises using an encrypted tunnel through the second access point device, and results in the second access point device being without a capability to decode encrypted internet data, associated with an established internet connection, that is carried through the second access point device via the encrypted tunnel.

8. The first access point device of claim 7, wherein enabling the internet connectivity comprises enabling the encrypted tunnel from the first access point device through the second access point device.

9. The first access point device of claim 7, wherein an internet connectivity bandwidth associated with the internet connectivity is a first bandwidth remaining after the first access point device utilizes a second bandwidth allocated for the first access point device.

10. The first access point device of claim 7, wherein the operations further comprise:
in response to sending the permission data, updating, by the first access point device, an access point device data structure.

11. The first access point device of claim 10, wherein the access point device data structure comprises first access point device identification data representative of the first access point device and second access point device identification data representative of the second access point device.

12. The first access point device of claim 7, wherein enabling the internet connectivity for the second access point device utilizes an internet service provider associated with the first access point device.

13. The first access point device of claim 12, wherein the internet service provider is a first internet service provider, and wherein the first internet service provider is different than a second internet service provider associated with the second access point device.

14. A non-transitory machine-readable medium, comprising executable instructions that, when executed by a processor, facilitate performance of operations, comprising:
receiving request data representative of a request to utilize a first access point device as a host access point device for an internet connectivity;
in response to receiving the request data, sending permission data representative of a permission to utilize the first access point device as the host access point device for the internet connectivity;
in response to receiving a first indication of a first service failure experienced by a second access point device, facilitating the internet connectivity for the second access point device via the first access point device; and
in response to receiving a second indication of a second service failure experienced by the first access point device, facilitating the internet connectivity for the second access point device via a third access point device.

15. The non-transitory machine-readable medium of claim 14, wherein the host access point device is a Wi-Fi access point device, and wherein the host access point device is the first access point device.

16. The non-transitory machine-readable medium of claim 15, wherein the Wi-Fi access point device utilizes a wired equivalency privacy protocol to facilitate the internet connectivity.

17. The non-transitory machine-readable medium of claim 14, wherein the operations further comprise:
in response to sending of the permission data, associating the host access point device with the second access point device.

18. The non-transitory machine-readable medium of claim 14, wherein the permission data is first permission data, wherein the permission is a first permission, and wherein the operations further comprise:
in response to receiving the second indication of the second service failure experienced by the first access point device, sending second permission data representative of a second permission to utilize the third access point device as the host access point device for the internet connectivity.

19. The non-transitory machine-readable medium of claim 14, wherein the operations further comprise:
in response to receiving the first indication of the first service failure, sending instruction data representative of an instruction to identify an alternate internet connection.

20. The non-transitory machine-readable medium of claim 19, wherein the alternate internet connection is a hard-wired connection.

* * * * *